(12) United States Patent
Wadgaonkar et al.

(10) Patent No.: US 8,975,445 B2
(45) Date of Patent: Mar. 10, 2015

(54) PROCESS FOR THE MANUFACTURE OF FUNCTIONAL PFPE DERIVATIVE

(75) Inventors: Prakash Wadgaonkar, Pune (IN); Shamal Menon, Pune (IN); Claudio Adolfo Pietro Tonelli, Monza (IT)

(73) Assignee: Solvay Specialty Polymers Italy S.p.A., Bollate (Milano) (IT)

( * ) Notice: Subject to any disclaimer, the term of this patent is extended or adjusted under 35 U.S.C. 154(b) by 695 days.

(21) Appl. No.: 13/262,692

(22) PCT Filed: Apr. 2, 2010

(86) PCT No.: PCT/EP2010/054468
§ 371 (c)(1),
(2), (4) Date: Oct. 3, 2011

(87) PCT Pub. No.: WO2010/115855
PCT Pub. Date: Oct. 14, 2010

(65) Prior Publication Data
US 2012/0028858 A1    Feb. 2, 2012

(30) Foreign Application Priority Data

Apr. 6, 2009  (IN) .............................. 709/DEL/2009
Jun. 11, 2009  (EP) ..................................... 09162507

(51) Int. Cl.
C08G 65/325 (2006.01)
C08G 65/00 (2006.01)
C08G 65/323 (2006.01)
C08G 65/333 (2006.01)
C08G 65/337 (2006.01)

(52) U.S. Cl.
CPC .......... C08G 65/007 (2013.01); *C10M 2213/06* (2013.01); C08G 65/325 (2013.01); C08G 65/33303 (2013.01); C08G 65/337 (2013.01)
USPC ............................ 568/615; 508/279; 508/582

(58) Field of Classification Search
USPC ................................... 508/582, 279; 568/615
See application file for complete search history.

(56) References Cited

U.S. PATENT DOCUMENTS

| | | | |
|---|---|---|---|
| 3,242,218 A | 3/1966 | Miller | |
| 3,442,942 A | 5/1969 | Sianesi et al. | |
| 3,650,928 A | 3/1972 | Sianesi et al. | |
| 3,665,041 A | 5/1972 | Sianesi et al. | |
| 3,810,874 A | 5/1974 | Mitsch et al. | |
| 3,847,978 A | 11/1974 | Sianesi et al. | |
| 4,113,772 A | 9/1978 | Lagow et al. | |
| 4,523,039 A | 6/1985 | Lagow et al. | |
| 4,898,682 A * | 2/1990 | Dekura ........................ 508/272 |

FOREIGN PATENT DOCUMENTS

| | | |
|---|---|---|
| EP | 148482 A2 | 7/1985 |
| EP | 1327644 A1 | 7/2003 |
| WO | WO 2005075441 A1 | 8/2005 |
| WO | WO 2009043928 A1 | 4/2009 |

OTHER PUBLICATIONS

Wu, Yong-Ming, et al—"Regioselective synthesis of fluoroalkylated [1,2,3]-triazoles by Huisgen cycloaddition", Journal of Fluorine Chemistry, 2004, vol. 125, p. 1415-1423, Elsevier B.V.; 9 pages.

Zhuzhgov E.L., et al—"Polyfluorinated Organic Compounds. X. Reaction of Perfluoro(2-methyl-2-pentene) with Sodium Azide", Russian Journal of Organic Chemistry, 1997, vol. 33 (5), p. 710-714, Translated from Zhurnal Organicheskoi Khimii, 1997, vol. 33 (5), p. 772-776; 5 pgs.

* cited by examiner

Primary Examiner — James Goloboy

(57) ABSTRACT

A process for the manufacture of a functional (per)fluoropolyether derivative comprising at least one triazole group, such process comprising: (1) reacting a (per)fluoropolyether hydroxyl derivative having at least one hydroxyl group [derivative (PFPE-OH)] with an activating agent, to yield an activated (per)fluoropolyether hydroxyl derivative comprising at least one activated hydroxyl group [derivative (a-PFPE-OH)]; (2) reacting said activated (per)fluoropolyether hydroxyl derivative [derivative (a-PFPE-OH)] with at least one azide salt to yield a functional (per)fluoropolyether derivative comprising at least one azido group [derivative (PFPE-$N_3$)]; and (3) reacting said functional (per)fluoropolyether derivative comprising at least one azido group [derivative (PFPE-$N_3$)] with a hydrocarbon compound having a terminal alkyne group to yield a functional (per)fluoropolyether derivative comprising at least one triazole group [derivative (PFPE-azole)].

6 Claims, No Drawings

PROCESS FOR THE MANUFACTURE OF FUNCTIONAL PFPE DERIVATIVE

CROSS-REFERENCE TO RELATED APPLICATIONS

This application is a U.S. national stage entry under 35 U.S.C. §371 of International Application No. PCT/EP2010/054468 filed Apr. 2, 2010, which claims priority to Indian Application No. 709/DEL/2009 filed Apr. 6, 2009 and European Application No. 09162507.9 filed Jun. 11, 2009, the whole content of these applications being herein incorporated by reference for all purposes.

TECHNICAL FIELD

The invention pertains to a process for the manufacture of functional perfluoropolyether compounds comprising at least one highly thermally stable triazole group.

BACKGROUND ART

Functionalized PFPE materials currently available in the market, in particular those commercialized by Solvay Solexis, are generally derivatives obtained from PFPE comprising —$CF_2CH_2OH$ end groups. Chemistry of —$CH_2OH$ group is generally used for introducing further functional moieties, notably via ether, ester, urethane or other similar bridging groups. Common feature of this chemistry is that the bridge between the PFPE chain and the (hydrogenated) functionality comprises a —$CF_2CH_2O$— moiety. The —$CH_2$— group sandwiched between a —$CF_2$— group and an oxygen atom has been possibly identified as possible source of thermal failures in these materials, which limits indeed thermal stability of PFPE functional derivatives containing the same.

The need was thus felt in the art for a manufacturing process for a new class of functional perfluoropolyether derivatives free from said weak —$CF_2\ CH_2O$— moiety but comprising highly thermally stable bridging groups.

DISCLOSURE OF INVENTION

It is thus an object of the present invention a process for the manufacture of a functional (per)fluoropolyether derivative comprising at least one triazole group [derivative (PFPE-azole)], said process comprising:
1. reacting a (per)fluoropolyether hydroxyl derivative having at least one hydroxyl group [derivative (PFPE-OH)] with an activating agent, to yield an activated (per)fluoropolyether hydroxyl derivative comprising at least one activated hydroxyl group [derivative (a-PFPE-OH)];
2. reacting said activated (per)fluoropolyether hydroxyl derivative [derivative (a-PFPE-OH)] with at least one azide salt to yield a functional (per)fluoropolyether derivative comprising at least one azido group [derivative (PFPE-$N_3$)];
3. reacting said functional (per)fluoropolyether derivative comprising at least one azido group [derivative (PFPE-$N_3$)] with a hydrocarbon compound having a terminal alkyne group to yield a functional (per)fluoropolyether derivative comprising at least one triazole group [derivative (PFPE-azole)].

The Applicant has found that by means of the process of the invention it is possible to manufacture functional PFPE derivatives having a highly thermally stable triazole group as a bridge between the PFPE chain and a hydrogenated functionality.

Derivative (PFPE-OH) to be used in the step 1. of the process of the invention is a (per)fluoropolyether hydroxyl derivative, that is to say that it comprises at least one fluoropolyoxyalkene chain ($R_f$) and at least one hydroxyl group.

The derivative (PFPE-OH) can comprise one or more than one hydroxyl group. Typically, said hydroxyl groups are comprised as end-groups in the derivative (PFPE-OH).

Said hydroxyl-containing end-groups of derivative (PFPE-OH) are preferably selected among groups of formula —$CF_2CH_2$—O—$(CH_2CH_2O)_{s'}H$ and —$CF_2CF_2CH_2$—O—$(CH_2CH_2O)_{s''}H$, wherein s' and s", equal or different each other and at each occurrence, are integers from 0 to 5, more preferably among groups of formula —$CF_2CH_2OH$ and —$CF_2CF_2CH_2OH$.

More preferably, said hydroxyl groups of derivative (PFPE-OH) are chosen among groups of formula —$CF_2CH_2$—O—$(CH_2CH_2O)_{s'}H$, as above detailed, and most preferably among those of formula —$CF_2CH_2OH$.

The fluoropolyoxyalkene chain ($R_f$) of the of derivative (PFPE-OH) is preferably a chain comprising repeating units R°, said repeating units being chosen among the group consisting of:
(i) —CFXO—, wherein X is F or $CF_3$,
(ii) —CFXCFXO—, wherein X, equal or different at each occurrence, is —F or $CF_3$, with the provision that at least one of X is —F,
(iii) —$CF_2CF_2CF_2O$—,
(iv) —$CF_2CF_2CF_2CF_2O$—,
(v) —$(CF_2)_j$—CFZ—O— wherein j is an integer from 0 to 3 and Z is a group of general formula —$OR'_fT_3$, wherein $R'_f$ is a fluoropolyoxyalkene chain comprising a number of repeating units from 0 to 10, said recurring units being chosen among the followings: —CFXO—, —$CF_2CFXO$—, —$CF_2CF_2CF_2O$—, —$CF_2CF_2CF_2CF_2O$—, with each of each of X being independently F or $CF_3$. and $T_3$ being a $C_1$-$C_3$ perfluoroalkyl group.

Thus, the derivative (PFPE-OH) typically complies with formula here below:

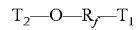

wherein:
— $R_f$ is a fluoropolyoxyalkene chain as above detailed, and
— $T_1$ and $T_2$, equal to or different from each other, are independently selected from
non-functional groups free from hydroxyl groups, preferably of formula —$CF_3$, —$CF_2$—$CF_3$, —$CF_2Cl$, —$CF_2CF_2Cl$, —$CF_2$—COF, —COF and mixtures thereof; and
functional hydroxyl groups comprising at least one hydroxyl group, with the provisio that at least one of $T_1$ and $T_2$ is a functional hydroxyl group.

Preferably, said functional hydroxyl groups are selected from those of formula —$CF_2CH_2O$—$(CH_2CH_2O)_{s'}H$ and —$CF_2CF_2CH_2O$—$(CH_2CH_2O)_{s''}H$, with s' and s" being an integer from 0 to 5, in particular s'=0 and s"=0.

Among functional PFPE hydroxyl derivative complying with formula $T_2$—O—$R_f$—$T_1$ as above detailed, monofunctional derivatives (PFPE-OH) are those wherein at least one of $T_1$ and $T_2$ is a non-functional group free from hydroxyl groups, the remainder being a functional hydroxyl group as above detailed, while bifunctional derivatives (PFPE-OH) are those wherein both $T_1$ and $T_2$ are functional hydroxyl groups as above detailed.

The derivative (PFPE-OH) preferably complies with formula here below: $T_2-O-(CFX^1O)_{c1}(CFX^2CFX^3O)_{c2}(CF_2CF_2CF_2O)_{c3}(CF_2CF_2CF_2CF_2O)_{c4}-T_1$ wherein

- $-X^1, X^2, X^3$ equal or different from each other and at each occurrence are independently $-F, -CF_3$;
- $-T_1$ and $T_2$, equal to or different from each other, have same meaning as above detailed;
- $-c1, c2, c3,$ and $c4$, equal or different from each other, are independently integers $\geq 0$, such that and $c1+c2+c3+c4$ is in the range 5 to 2000, preferably between 10 and 500; should at least two of c1, c2, c3 and c4 be different from zero, the different recurring units are generally statistically distributed along the chain.

The (per)fluoropolyether hydroxyl derivatives having at least one hydroxyl group suitable for the purposes of the invention can be notably manufactured by photoinitiated oxidative polymerization (photooxidation reaction) of per(halo)fluoromonomers, as described in U.S. Pat. No. 3,442,942 (MONTEDISON SPA) May 6, 1969, U.S. Pat. No. 3,650,928 (MONTEDISON SPA) Mar. 21, 1972, and U.S. Pat. No. 3,665,041 (MONTEDISON SPA) May 23, 1972. Typically, mixtures of perfluoropolyethers can be obtained by combination of hexafluoropropylene and/or tetrafluoroethylene with oxygen at low temperatures, in general below −40° C., under U.V. irradiation, at a wavelength ($\lambda$) of less than 3 000 Å. Subsequent conversion of end-groups as described in U.S. Pat. No. 3,847,978 (MONTEDISON SPA) Nov. 12, 1974 and in U.S. Pat. No. 3,810,874 B (MINNESOTA MINING & MFG) May 14, 1974 is notably carried out on crude products from photooxidation reaction for obtaining derivatives (PFPE-OH).

As an alternative, functional PFPEs can be obtained by fluorination and simultaneous fragmentation of hydrogenated polyethers, like notably polyethylene oxide, as described in U.S. Pat. No. 4,113,772 (CENTRAL GLASS) Sep. 12, 1978 or in U.S. Pat. No. 4,523,039 (THE UNIVERSITY OF TEXAS) Jun. 11, 1985 and subsequent transformation of terminal groups (typically carboxylic acid groups) in corresponding hydroxyl groups.

Still, functional PFPEs can be prepared by ring-opening polymerizing 2,2,3,3-tetrafluorooxethane in the presence of a polymerization initiator to give a polyether comprising repeating units of the formula: $-CH_2CF_2CF_2O-$, and subsequent fluorination of said polyether, as detailed in EP 148482 A (DAIKIN INDUSTRIES) Jul. 17, 1985, or by ionic hexafluoropropylene epoxide oligomerization as described in U.S. Pat. No. 3,242,218 (DU PONT) Mar. 22, 1966. Subsequent conversion of end-groups following procedures detailed herein above for products from photooxidation reaction can be applied here to introduce hydroxyl terminal groups.

In step 1. of the process of the invention, the derivative (PFPE-OH) is reacted with an activating agent as above described to yield the activated (per)fluoropolyether hydroxyl derivative comprising an activated hydroxyl group. The term "activated" should be understood to mean that the reaction of the free hydroxyl group of the derivative (PFPE-OH) transforms said hydroxyl group into a different functionality which has increased reactivity towards nucleophilic substitution, in particular towards reaction with an azide salt.

The activating agent suitable for the process of the invention is preferably chosen among:

thionyl halides of formula:

$$SO_2X$$

wherein X=Cl, Br;

sulphinyl halides of formula:

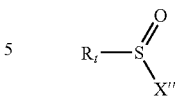

wherein $R_t$ is a $C_1-C_{12}$ hydrocarbon radical, linear or branched, optionally fluorinated; and X=Cl, Br;

organic sulphonyl halides of formula:

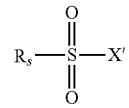

wherein $R_s$ is a $C_1-C_{12}$ hydrocarbon radical, linear or branched, optionally fluorinated and X' is Cl or Br.

Non limitative examples of organic sulphonyl halides are notably:

tosyl halides of formula:

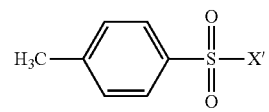

brosyl halides of formula:

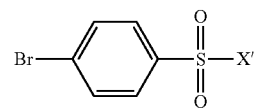

triflyl halides of formula:

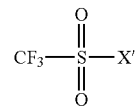

nonaflyl halides of formula:

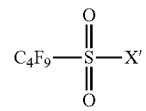

mesyl halides of formula:

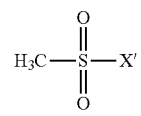

wherein X' in all formulae here above has the same meaning as above detailed.

Thus, the activated functional PFPE hydroxyl derivative [derivative (a-PFPE-OH)] typically complies with formula here below:

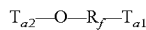

wherein:
- $-R_f$ is a fluoropolyoxyalkene chain as above detailed, and
- $-T_{a1}$ and $T_{a2}$, equal to or different from each other, are independently selected from:
- non-functional groups free from hydroxyl groups, preferably of formula $-CF_3$, $-CF_2-CF_3$, $-CF_2Cl$, $-CF_2CF_2Cl$, $-CF_2-COF$, $-COF$ and mixtures thereof; and
- activated hydroxyl groups comprising a group Y, with Y being a halogen selected from Cl and Br, a group of formula $-OSOR_t$, wherein $R_t$ is a $C_1$-$C_{12}$ hydrocarbon radical, linear or branched, optionally fluorinated, or a group of formula $-OSO_2R_s$, wherein $R_s$ is a $C_1$-$C_{12}$ hydrocarbon radical, linear or branched, optionally fluorinated, with the provisio that at least one of $T_{a1}$ and $T_{a2}$ is an activated hydroxyl group.

Most preferred hydroxyl groups of derivative (PFPE-OH) of formulae $-CF_2CH_2OH$ and $-CF_2CF_2CH_2OH$, as above detailed, are advantageously transformed in this step to corresponding activated groups of formulae, respectively $-CF_2CH_2Y$ and $-CF_2CF_2CH_2Y$, with Y being a halogen selected from Cl and Br, a group of formula $-OSORt$, wherein $R_t$ is a $C_1$-$C_{12}$ hydrocarbon radical, linear or branched, optionally fluorinated, or a group of formula $-OSO_2R_s$, wherein $R_s$ is a $C_1$-$C_{12}$ hydrocarbon radical, linear or branched, optionally fluorinated.

Generally, step 1. of the process of the invention, is carried out in the presence of a base, preferably of an organic base soluble in the reaction medium.

Non (imitative examples of suitable bases are notably trialkyl amines (e.g. triethylamine, trimethylamine) and/or heteroaromatic amines (e.g. pyridine).

In step 2. the derivative (a-PFPE-OH) is reacted with an azide salt.

Step 2. can be analyzed as a nucleophilic substitution on the activated hydroxyl moiety of the activated (per)fluoropolyether by the inorganic azide salt.

Said inorganic azide salt preferably complies with formula:

wherein M represents a monovalent or divalent metal cation, preferably an alkali metal or an alkaline earth metal cation, and n represents 1 or 2.

An inorganic azide salt which gave particularly good results in the process of the invention is sodium azide.

The azido PFPE derivative [derivative (PFPE-N$_3$)] obtained in this step typically complies with formula here below:

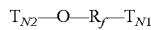

wherein:
- $-R_f$ is a fluoropolyoxyalkene chain as above detailed, and
- $-T_{N1}$ and $T_{N2}$, equal to or different from each other, are independently selected from:
- non-functional groups free from hydroxyl groups, preferably of formula $-CF_3$, $-CF_2-CF_3$, $-CF_2Cl$, $-CF_2CF_2Cl$, $-CF_2-COF$, $-COF$ and mixtures thereof; and
- functional groups comprising an azido group $N_3$, with the provisio that at least one of $T_{N1}$ and $T_{N2}$ is an azido-containing group.

Thus, most preferred activated hydroxyl groups of derivative (a-PFPE-OH) of formulae $-CF_2CH_2Y$ and $-CF_2CF_2CH_2Y$, as above detailed, are converted into corresponding $-CF_2CH_2N_3$ and $-CF_2CF_2CH_2N_3$ groups.

Organic solvents can be used in step 2. of the process of the invention; said organic solvents can be fluorinated or not fluorinated. Among fluorinated solvents which have been used with success, mention can be notably made of 1,3-bis(trifluoromethyl)benzene, GALDEN® HT110 and GALDEN® D100 perfluoropolyethers, commercially available from Solvay Solexis S.p.A., NOVEC® HFE 7200 fluoroether, commercially available from 3M, trifluoromethyl benzene (benzotrifluoride) and the like. Also non-fluorinated solvents can be used. Among non-fluorinated solvents, polar organic solvents are preferred. Generally, the dielectric constant of the solvent is considered to provide a rough measure of a solvent's polarity. Polar non-fluorinated organic solvents hereby concerned are thus those who possess a dielectric constant of at least 8 at 25° C. More preferably, solvents for step 2. of the present invention will be selected among aprotic solvents. Among these latter, mention can be made of N,N-dimethylformamide, N-methylacetamide, dimethylsulphoxide, morpholine, acetonitrile, diglyme, tetraglyme, 1,4-dioxane or mixtures thereof.

In step 3. the functional (per)fluoropolyether derivative comprising at least one azido group is reacted with a hydrocarbon compound having a terminal alkyne group to yield a functional (per)fluoropolyether derivative comprising at least one triazole group.

The selection of the hydrocarbon compound having terminal alkyne group is not particularly limited. Low molecular weight molecules having one or more alkyne groups or oligomeric or polymeric materials having one or more alkyne groups in end groups or in the chain (generally in end groups) can be used.

For the avoidance of doubts, a triazole group is a structure of formula:

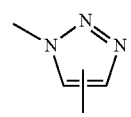

wherein the substituent groups can be located in 1,4- or 1,5-position.

Step 3. can be described as an azido-alkyne [3+2] cycloaddition.

Step 3. generally requires the use of a catalyst; while use thereof is not mandatory and cycloaddition may proceed in its absence, it is nevertheless preferred for achieving appreciable reaction rate to carry out step 3. in the presence of a catalyst.

The triazole PFPE derivative [derivative (PFPE-azole)] obtained in this step typically complies with formula here below:

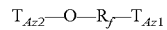

wherein:
- $-R_f$ is a fluoropolyoxyalkene chain as above detailed, and
- $-T_{Az1}$ and $T_{Az2}$, equal to or different from each other, are independently selected from
- non-functional groups free from hydroxyl groups, preferably of formula $-CF_3$, $-CF_2-CF_3$, $-CF_2Cl$, $-CF_2CF_2Cl$, $-CF_2-COF$, $-COF$ and mixtures thereof; and functional triazole groups comprising an azole group of formula:

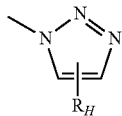

with $R_H$ being a hydrocarbon group, optionally fluorinated, with the provisio that at least one of $T_{Az1}$ and $T_{Az2}$ is an azole-containing group.

Preferably, the derivative (PFPE-azole) complies with formula here below:

formula (1)

wherein
- $X^1$, $X^2$, $X^3$ equal or different from each other and at each occurrence are independently —F, —$CF_3$;
- $T_{AZ1}$ and $T_{Az2}$, equal to or different from each other, have same meaning as above detailed;
- c1, c2, c3, and c4, equal or different from each other, are independently integers ≥0, such that and c1+c2+c3+c4 is in the range 5 to 2000, preferably between 10 and 500; should at least two of c1, c2, c3 and c4 be different from zero, the different recurring units are generally statistically distributed along the chain.

Functional triazole groups of the derivative (PFPE-azole) preferably comply with formulae:

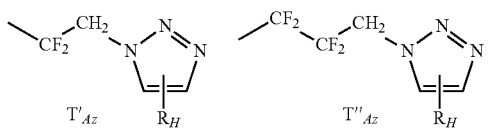

with $R_H$ being a hydrocarbon group, optionally fluorinated.

Group $R_H$ can be a polymeric, oligomeric or monomeric chain. Said group can optionally comprise aromatic moieties and/or functional groups of any type.

The selection of appropriate $R_H$ group will be carried out by the skilled in the art as a function of final properties/applications sought for derivative (PFPE-azole).

Suitable catalysts for step 3. of the process of the invention are notably transition metal catalysts, more particularly Copper, Nickel, Platinum, Palladium, and Ruthenium-based catalysts.

Among Copper catalysts, those comprising $Cu^I$ are preferred; $Cu^I$ can be generated in situ by addition of a reducing agent to $Cu^{II}$ species or of an oxidizing agent to metallic Cu or can be provided in the reaction medium by direct addition of a $Cu^I$ salt.

Sources of $Cu^{II}$ are not particularly limited and include notably $CuSO_4$, $Cu(NO_3)_2$, $CuCl_2$, and variously hydrated forms thereof. Suitable reducing agents for reducing $Cu^{II}$ species to more active $Cu^I$ species are notably sodium ascorbate, hydrazine, and tris(2-carboxyethyl)phosphine.

Among suitable $Cu^I$ salts, mention can be notably made of CuBr, CuI, $CuOT_f.C_6H_6$ (with $OT_f$ being trifluoromethansulfonate), $[Cu(NCCH_3)_4][PF_6]$. In case of addition of $Cu^I$ salts, it is generally preferred to also add a base, like notably 2,6-lutidine or diisopropylethylamine (DIPEA), this latter being preferred.

Among Nickel catalysts, mention can be made of $NiCl_2$, $NiBr_2$, $Ni(OOCCH_3)_2$, $Ni(acac)_2$ (acac being acetylacetonate) and of various organometallic derivatives thereof, like notably phosphine, cyclopentadienyl and other derivatives.

Among Pt and Pd catalysts, mention can be notably made of corresponding chlorides, bromides, acetates, acetylacetonates and of various organometallic derivatives thereof, like notably phosphine, cyclopentadienyl and other derivatives.

Among Ruthenium catalyst, cyclopentadienyl organometallic complexes thereof are preferred, like notably Cp*Ru, Cp*RuCl(PPh_3)_2, with Cp* being pentamethylcyclopentadienyl.

The Applicant has thus surprisingly found that by above sketched sequence of reactions as provided in step 1., 2. and 3., here above, it is surprisingly possibly to successfully apply azido-alkyne click chemistry to the hereby concerned particular hydroxyl derivatives of (per)fluoropolyether, thus enabling access to functionalized PFPE having a triazole bridging group.

Still an object of the invention are (per)fluoropolyether triazole derivatives [derivative (PFPE-azole)] having at least one triazole group, as above described, which can be obtained from the process of the invention.

Derivative (PFPE-azole) of the invention is a (per)fluoropolyether triazole derivative, that is to say that it comprises at least one fluoropolyoxyalkene chain ($R_f$) and at least one triazole group.

The derivative (PFPE-azole) can comprise one or more than one triazole group. Typically, said hydroxyl groups are comprised as end-groups in the derivative (PFPE-azole).

Still another object of the invention is the use of the derivative (PFPE-azole) as additives in lubricating compositions or in polymer materials.

The invention will be now described in more detail with reference to the following examples, whose purpose is merely illustrative and not intended to limit the scope of the present invention.

EXAMPLE 1

Step 1. Preparation of Bis-Nonaflate-Terminated PFPE Derivative

Into a 100 ml two necked round bottom flask equipped with a magnetic stirrer and a reflux condenser were placed 20 g of (per)fluoropolyether hydroxyl derivative of structure: $HOCH_2CF_2O$—$(CF_2O)_{c1}(CF_2CF_2O)_{c2}CF_2$ $CH_2OH$ ($M_W$ 1476, c2/c1 ratio=1.9, 0.0135 moles), 20 ml of hexafluoroxylene as reaction solvent. After addition of 3 g of triethylamine (TEA) (0.03 moles), the mass was cooled down to 5° C. Then, under magnetic stirring, 9 g of perfluorobutan sulphonylfluoride (0.03 moles) drop-wise were added in 3 h. The temperature was increased at 20° C. Then, 10 ml of water and 1 ml of methanol were added to the reaction mixture, the hydroalcoholic phase was separated and this liquid phase extraction repeated three times. The combined organic layers were collected, solvent was removed under vacuum at 60° C.; a final filtration of the organic product gave 27 g of bis-nonaflate-terminated PFPE. The $^{19}F$ and $^1H$ NMR analyses confirmed the expected structure with a purity >95%. Yield 96%.

Step 2. Preparation of Bis-Azido Terminated PFPE Derivative

Into a 100 ml two necked round bottom flask equipped with a magnetic stirrer and a reflux condenser were placed the nonaflate-terminated PFPE derivative obtained in Step 1. (10 g, 0.0049 mol), MW 2040, C2/C1 ratio 1.9, and two functional end-groups per molecule; $NaN_3$ (0.78 g, 0.0113 mol) and dry dimethylformamide (DMF) (30 mL). The reaction mixture was degassed three times by freeze-pump-thaw cycles and then heated at 110° C. for 24 h. The reaction mixture was poured into water (300 ml) and extracted with GALDEN® ZV 60 PFPE solvent (3×50 ml). The combined organic layers was washed with water and dried over anhydrous sodium sulphate. The solvent was removed under vacuum at 60° C. to obtain 5.5 g of diazido-terminated PFPE as free flowing viscous liquid. The $NMR^{19}F$ and $^1H$ analyses confirmed the expected structure with a purity >95%. Yield 75%.

Step 3. Preparation of bis-[1,2,3]-triazole PFPE Derivative

Into a 25 ml two necked round bottom flask equipped with a magnetic stirrer and a reflux condenser were placed azido terminated PFPE from Step 2. (2 g, 0.0013 mol), and phenyl acetylene (0.31 g, 0.003 mol). To the reaction mixture were added, N,N-diisopropylethylamine (DIPEA) (0.077 g, 0.0006 mol), DMF (12 mL), and CuI (0.06 g, 0.0003 mol) in that order. The reaction mixture was heated at 60° C. for 24 h. The reaction mixture was washed with 2.5% aqueous solution of EDTA disodium salt (4×10 mL) for removal of CuI salt. The reaction mixture was extracted with GALDEN® ZV 60 PFPE solvent (3×10 mL) and the solution was dried over anhydrous sodium sulphate. The solvent was removed under vacuum at 50° C. for 5 h to obtain 1.9 g of bis-[1,2,3]-triazole PFPE derivative as a waxy solid, accordingly to $^{19}F$ and $^1H$ NMR analyses. Yield 85%.

EXAMPLE 2

Step 1. Preparation of Nonaflate-Terminated PFPE

Into a 100 ml two necked round bottom flask equipped with a magnetic stirrer and a reflux condenser were placed 30 g of PFPE alcohol of structure: $CF_3O—(CF_2O)_{c1}(CF_2CF_2O)_{c2}CF_2CH_2OH$ (MW 528, c2/c1 ratio=2.3, 0.0568 moles). Then 30 ml of hexafluoroxylene as reaction solvent were added. After addition of 6.1 g of TEA (0.06 moles), the mass was cooled down to 5° C. Then, under magnetic stirring, 18 g of perfluorobutan sulphonylfluoride (0.06 moles) dropwise were added in 3 h. The temperature was increased at 20° C. Then, 10 ml of water and 1 ml of methanol were added to the reaction mixture, the hydro-alcoholic phase was separated and this liquid phase extraction repeated three times. The combined organic layers were collected, solvent was removed under vacuum at 60° C.; a final filtration of the organic product gave 44.8 g of nonaflate-terminated PFPE. The $^{19}F$ and $^1H$ NMR analyses confirmed the expected structure with a purity >95%. Yield 97%.

Step 2. Preparation of Azido Terminated PFPE Derivative

Into a 100 ml two necked round bottom flask equipped with a magnetic stirrer and a reflux condenser were placed 15.40 g, 0.019 mol of PFPE monofunctional-nonaflate (Mw 810, $C_2/C_1$ ratio 2.3) from Step 1. and NaN 3 (2.47 g, 0.038 mol). The reaction mixture was degassed three times by freeze-pump-thaw cycles. Dry N,N-dimethylformamide (30 mL) was added to the reaction mixture and the reaction mixture was heated with continuous stirring at 110° C. for 24 h. The reaction mixture was poured into water (300 ml) and was extracted with GALDEN® ZV 60 PFPE solvent (3×50 ml). The combined organic layers was washed with water, dried over anhydrous sodium sulphate and filtered. The solvent was carefully removed by fractional distillation followed by distillation of azido-terminated PFPE. 7.7 g of azido-terminated PFPE derivative was so obtained, accordingly to $NMR^{19}F$ and $^1H$ analyses. Yield: 70%.

Step 3. Preparation [1,2,3]-triazole PFPE Derivative

Into a 50 ml two necked round bottom flask equipped with a magnetic stirrer and a reflux condenser were placed 2 g, 3.1 mmol of azido-terminated PFPE from Step 2. and phenyl acetylene (0.48 g, 4.7 mmol). To the reaction mixture were added DIPEA (0.14 g, 1 mmol), dry N,N-dimethylformamide (20 mL) and CuI (0.137 g, 0.7 mmol) in that order. The reaction mixture was heated at 60° C. for 24 h. The reaction mixture was washed with 2.5% aqueous solution of EDTA disodium salt (4×20 mL) for removal of CuI salt. The reaction mixture was extracted with GALDEN® ZV-60 PFPE (3×10 mL) and the solution was dried over anhydrous sodium sulphate. The solvent was removed under vacuum at 60° C. for 5 h to obtain as a wax solid 1.9 g of monosubstituted [1,2,3]-triazole PFPE derivative, accordingly to $^{19}F$ and $^1H$ NMR analyses. Yield 85%.

The invention claimed is:

1. A (per)fluoropolyether triazole derivative comprising at least one fluoropolyoxyalkene chain ($R_f$) and at least one triazole group [derivative (PFPE-azole)], said derivative (PFPE-azole) complying with the following formula:

$$T_{Az2}—O—R_f—T_{Az1}$$

wherein:
— $R_f$ is a fluoropolyoxyalkene chain comprising repeating units R°, said repeating units being selected from the group consisting of:
  (i) —CFXO—, wherein X is F or $CF_3$,
  (ii) —CFXCFXO—, wherein X, equal or different at each occurrence, is F or $CF_3$, with the provision that at least one of X is —F,
  (iii) —$CF_2CF_2CF_2O$—,
  (iv) —$CF_2CF_2CF_2CF_2O$—, and
  (v) —$(CF_2)_j$—CFZ—O—, wherein j is an integer from 0 to 3, and Z is a group of general formula: —$OR_f'T_3$, wherein $R_f'$ is a fluoropolyoxyalkene chain comprising a number of repeating units from 0 to 10, said recurring units selected from the group consisting of: —CFXO—, —$CF_2$CFXO—, —$CF_2CF_2CF_2O$—, and —$CF_2CF_2CF_2CF_2O$—, with each of X being independently F or $CF_3$, and $T_3$ being a $C_1$-$C_3$ perfluoroalkyl group, and
— $T_{Az1}$ and $T_{Az2}$, equal to or different from each other, are independently selected from the group consisting of:
  non-functional groups free from hydroxyl groups; and
  functional triazole groups comprising an azole group of formula:

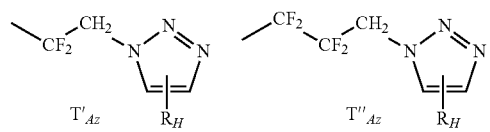

with $R_H$ being a hydrocarbon group, optionally fluorinated, with the proviso that at least one of $T_{Az1}$ and $T_{Az2}$ is an azole-containing group.

2. The derivative (PFPE-azole) of claim 1, complying with the following formula (1):

$T_{Az2}-O-(CFX^1O)_{c1}(CFX^2CFX^3O)_{c2}(CF_2CF_2CF_2O)_{c3}(CF_2CF_2CF_2CF_2O)_{c4}-T_{Az1}$ wherein — $X^1, X^2, X^3$ equal to or different from each other and at each occurrence are independently —F or —$CF_3$;

— $T_{Az1}$ and $T_{Az2}$, equal to or different from each other, have same meaning as defined in claim 1;

— c1, c2, c3, and c4, equal to or different from each other, are independently integers ≥0, such that and c1+c2+c3+c4 is in the range 5 to 2000; with the provision that should at least two of c1, c2, c3 and c4 be different from zero, the different recurring units are statistically distributed along the chain.

3. A method for making a lubricating composition or polymer material, comprising using the derivative (PFPE-azole) of claim 1 as an additive-in a lubricating composition or in a polymer material.

4. The derivative (PFPE-azole) of claim 2, wherein c1+c2+c3+c4 is between 10 and 500.

5. The derivative (PFPE-azole) of claim 2, wherein the non-functional groups free from hydroxyl groups are each independently selected from —$CF_3$, —$CF_2$—$CF_3$, —$CF_2Cl$, —$CF_2CF_2Cl$, —$CF_2$—COF, —COF and mixtures thereof.

6. A lubricating composition or polymer material comprising the derivative (PFPE-azole) of claim 1.

* * * * *